United States Patent
Liot

(10) Patent No.: US 6,403,141 B1
(45) Date of Patent: Jun. 11, 2002

(54) METHOD OF OBTAINING LONG SHELF LIFE LIQUID EGG PRODUCTS

(76) Inventor: Michel Liot, 22, avenue du 11 Novembre, 86450 Pleumartin (FR)

( * ) Notice: Subject to any disclaimer, the term of this patent is extended or adjusted under 35 U.S.C. 154(b) by 0 days.

(21) Appl. No.: 09/488,347

(22) Filed: Jan. 20, 2000

(30) Foreign Application Priority Data

Jan. 20, 1999 (FR) .......................................... 99 00592

(51) Int. Cl.⁷ .............................................. A23L 1/28
(52) U.S. Cl. ...................................... 426/614; 426/521
(58) Field of Search ................................ 426/614, 521

(56) References Cited

U.S. PATENT DOCUMENTS

| | | | |
|---|---|---|---|
| 2,565,311 A | * | 8/1951 | Koonz et al. |
| 4,957,760 A | * | 9/1990 | Swartzel et al. |
| 4,989,668 A | | 2/1991 | Shimizu ....................... 165/47 |
| 5,167,976 A | * | 12/1992 | Papetti ......................... 426/614 |
| 5,455,054 A | | 10/1995 | Bryson et al. ................ 426/106 |
| 5,612,076 A | * | 3/1997 | Samimi et al. .............. 426/614 |
| 5,741,539 A | * | 4/1998 | Knipper et al. .............. 426/614 |

FOREIGN PATENT DOCUMENTS

| | | |
|---|---|---|
| DE | 94 09 959.6 | 10/1994 |
| DE | 44 13 500 | 12/1994 |
| DE | 44 21 533 | 12/1995 |
| EP | 0 373 026 | 6/1990 |
| FR | 2 492 226 | 4/1982 |
| FR | 2 641 676 A | 7/1990 |
| FR | 2 750 574 A | 1/1998 |
| FR | 2 751 180 A | 1/1998 |
| GB | 579 605 A | 8/1946 |
| GB | 2 282 051 A | 3/1995 |
| GB | 2 297 234 A | 7/1996 |

OTHER PUBLICATIONS

Database Abstract. AN 78(06):Q0072 FSTA. Journal of Food Technology. 13(1) pp. 25–30. Authors: Northolt et al, 1978.*

* cited by examiner

Primary Examiner—Anthony J. Weier
(74) Attorney, Agent, or Firm—Nawrocki, Rooney & Sivertson P.A.

(57) ABSTRACT

A method of obtaining long shelf life liquid egg products, comprising the steps of; (a) selecting at least one of the liquid fractions (9, 10, 11) to be processed obtained after breaking of the eggs: egg white (9), egg yolk (10), whole egg (11); (B) heating the fraction or fractions (9, 10, 11) to a maintenance temperature between approximately 40 and 55° C. for the egg white fraction (9), and preferably 45° C., between 50 and 66° C. for the yolk fraction (10), and preferably 55° C., and between 50 and 66° C. for the egg white and yolk mixture fraction (11), and preferably 55° C.; (C) temperature maintenance of the fraction or fractions (9, 10, 11) at the maintenance temperature for a period between approximately 30 minutes and four days; and cooling to a temperature below approximately 20° C.

8 Claims, 1 Drawing Sheet

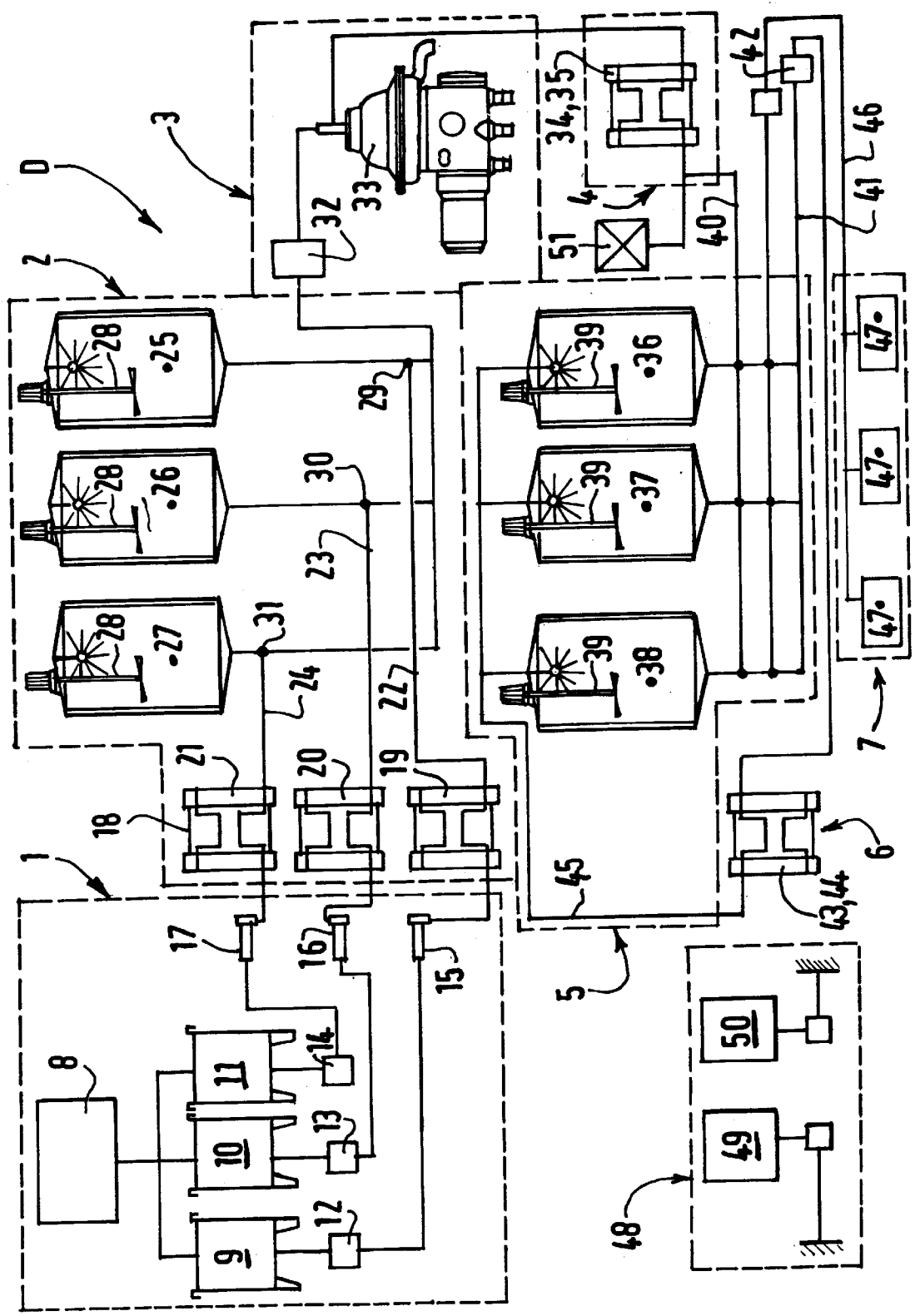

METHOD OF OBTAINING LONG SHELF LIFE LIQUID EGG PRODUCTS

The object of the invention is a method of obtaining fresh egg products, whites, yolks or whole eggs, with a long shelf life after heat treatment, and a device implementing this method.

Methods intended for increasing the time for which egg products can be kept are already known, using heat treatment, notably pasteurising.

Numerous methods have been developed for limiting the risks of deterioration of products due to pasteurisation.

The document WO 97/10 718 describes a method of treating a liquid product based on egg, consisting essentially of white of egg and/or egg yolk. The product is subjected to a pasteurisation process with two temperature levels.

The document WO 96/38 045 describes a method of producing liquid egg with a long storage life at room temperature. The method comprises a step of heating by applying an AC electric current at high frequency, and then a cooling, and then once again a heating by the application of a high frequency AC current.

The document EP A 482 228 describes a method using a turbulent flow at high temperature (below 160° F.) for less than one minute and then followed by an immediate rapid cooling (25 to 40° F.)

These methods entail complex heat treatments and in spite of everything present risks of deterioration of the products.

The document FR A 2 720 602 describes a method of pasteurising liquid food products based on eggs. The liquid egg represents a small proportion, between 15 and 55% of the weight of the mixture. The pasteurisation takes place between 65 and 70° C.

The document FR A 2 750 574 describes a method of treating liquid egg whites obtained after breaking a fresh egg including a step of substantially continuous and slow heating up to a maintenance temperature. The method comprises the following steps:

- breaking the fresh eggs and separating the constituents, at a temperature of between 0 and 18° C.;
- a slow rise in temperature of the liquid egg white in a vessel with a heat exchanger, over a period of between 30 and 240 minutes, up to the maintenance temperature of between 40 and 48° C., and preferably between 42 and 45° C.;
- maintaining the maintenance temperature at this level for one to five days, the product being packaged in air-tight receptacles.

However, this method does not concern liquid egg yolks nor whole eggs.

Other methods, using radiation, have been envisaged for preventing thermal degradation.

For example, the document WO 96/39 876 describes a method using electric fields, the document WO 95/26 636 describes a method using radio waves, the document EP-A-497 099 describes a method using alternating electromagnetic fields.

Another type of method consists of using additives.

The document FR A 2 751 181 uses bacteriologically stabilised markers, the document WO 96/32 019 uses an edible plastic covering which surrounds the eggs. The document EP A 663 151 describes a method using an acidic fermented starchy composition. However, the use of additives interferes with the obtaining of natural products.

Moreover, the use of radiation or additives is not always well perceived by consumers.

Thus a simple method is sought, making it possible to mitigate the drawbacks of the previous techniques, and to obtain liquid egg products with a long shelf life, egg white, egg yolk or whole egg, very similar to the original products, and able to be stored at room temperature for several months, typically three to six months.

The object of the invention, according to a first aspect, is a method of obtaining liquid egg products with a long shelf life, comprising heat treatment after breaking the fresh eggs and separating the components at a temperature of between 0 and 25° C. The method comprises the steps of:

- selecting at least one of the liquid fractions (9, 10, 11) to be treated obtained after breaking the eggs: egg whites (9), egg yolks (10), whole egg (11);
- cold storage at a temperature below 20° C., preferably 4° C., for a period of less than three days, and preferably one day;
- clarification or homogenisation in order to eliminate residual impurities, and bursting the fraction or fractions (9, 10, 11) into small particles, the temperature being below 20° C.;
- rapid heating of the fraction or fractions (9, 10, 11) substantially immediately or in a few minutes, up to a maintenance temperature of between approximately 40 and 55° C. for the whites fraction (9), and preferably 45° C., between 50 and 66° C. for the yolk fraction (10), and preferably 55° C., and between 50 and 66° C. for the whole egg fraction (11), and preferably 55° C.;
- maintenance at the maintenance temperature, with degassing by slow stirring, of the fraction or fractions (9, 10, 11) for a period of between approximately 30 minutes and 4 days;
- cooling to the storage temperature, below 25° C.;

the storage life being at least three months without the incorporation of additives.

According to one embodiment, the fraction or fractions are filtered after breaking the eggs and before the cold storage.

After the cooling step which follows the temperature maintenance step, the fraction or fractions are packed in airtight packages for storage for approximately three to six months.

According to one embodiment, the cooling after the temperature maintenance step takes place in a closed loop.

According to a variant embodiment, the fractions are processed substantially simultaneously during the refrigeration storage step and the step of heating to the maintenance temperature.

According to another variant embodiment, the selected fractions are processed in alternation, successively for each step of the method.

According to one embodiment, between the step of heating to the maintenance temperature and the temperature maintenance step, the fraction or fractions undergo an additional concentration step, for example by ultrafiltration, so as to obtain an increase in the dry extract in the fractions.

The fractions are maintained at a maintenance temperature, from 40 to 55° C. for the whites, from 50 to 66° C. for the whole egg, with additives added such as sugar or salt before being cooled during the cooling step.

According to a second aspect, the object of the invention is a device implementing the method according to the invention. This comprises means of breaking and separating the eggs into white, yolk or whole egg fractions, means of filtering these fractions and means of cooling the filtered fractions.

The device comprises means for storing cold, typically between 0 and 4° C., such as buffer tanks.

According to a variant embodiment, the cooling means are plate exchangers, tubular exchangers or the like, distinct from the storage means.

According to another variant, the cooling means are integrated into the double jacket buffer tank storage means.

The device comprises means of pumping the fractions refrigerated by the cooling means, into homogenisation means such as a high pressure pump and/or into washing means, the homogenisation means and the washing means enabling the fractions to burst before heating to the maintenance temperature.

The device comprises means for rapid heating above 40° C., up to a temperature close to the maintenance temperature.

According to one embodiment, the heating means are plate exchangers.

The device comprises hot-storage means such as hot double jacket process tanks, means of monitoring and controlling the temperature in the process tanks for maintaining the fractions at the maintenance temperature, and slow stirring means for facilitating the degassing of the fractions in the process tanks.

The process tanks and buffer tanks have a capacity of between 1000 and 20,000 litres, and preferably between 5000 and 10,000 litres.

The device comprises means of cooling after the step of maintaining at the maintenance temperature, which allows cooling, in a loop, of the fractions in process tanks without the incorporation of air.

According to a variant, the device comprises means of concentration, for example by ultrafiltration, and means of drying the concentrated fractions.

It comprises means for the separate packaging of the fractions after the cooling step.

FIG. 1 represents a first embodiment of the method according to the invention.

The invention will be clearly understood by virtue of the accompanying drawing.

A first embodiment is now described.

The device D comprises:
- a first separation-filtration breaking module 1;
- a second module 2 for cooling and storage cold;
- a third module 3 for washing or homogenisation;
- a fourth heating module 4;
- a fifth module 5 hereinafter referred to as the process module;
- a sixth cooling module 6;
- a seventh packaging module 7.

The first module 1 comprises a fresh egg breaker 8, typically between 0 and 25° C., and preferably between 15 and 17° C.

The eggs are separated after breaking into a white of egg fraction 9, a egg yolk fraction 10, and a fraction 11 referred to as ※whole eggs※, obtained by mixing the whites and yolks. In this embodiment, the method relates to the three fractions, whites, yolks and whole egg, which undergo separate processing after breaking.

The fractions 9, 10, 11 are pumped by pumping means such as positive pumps 12, 13, 14 respectively, and then filtered by filtration means such as tube filters 15, 16, 17, at least one for each fraction. The filtration diameter is, for example, around 500 microns, so as to eliminate the majority of the residual particles after breaking.

The fractions 9, 10, 11 are then routed to the second module 2.

The module comprises means 18 of cooling the fractions 9, 10, 11.

The cooling means 18 are typically plate exchangers 19, 20, 21, one per fraction. It is also possible to use tubular exchangers, for example.

The fractions 9, 10, 11 are then routed through pipes 22, 23, 24 into cold storage means such as buffer tanks 25, 26, 27 respectively, with a double jacket.

The throughput at the plate exchangers 19, 20, 21 is for example from 0 to 10,000 litres per hour at 0° C. The buffer tanks 25, 26, 27 have for example a capacity of 5000 litres or more and the temperature in the tanks is around 4° C.

According to a variant embodiment, the second module 2 comprises no cooling means 18 distinct from the buffer tanks 25, 26, 27. The fractions 9, 10, 11 are cooled directly in the buffer tanks 25, 26, 27, more slowly, for example in a few hours, to a temperature of around 4°.

The fractions 9, 10, 11 are mixed by means of stirring means 28 in the buffer tanks in order to maintain a satisfactory temperature. The period of storage in the buffer tanks 25, 26, 27 can be from a few hours to a few days, and preferably one day.

The period of cold storage is sufficiently short to limit the development of microbial flora in the buffer tanks 25, 26, 27 before the rise in temperature.

The fractions are then routed by actuating valves 29, 30, 31 and means 32 of pumping into the third module 3.

The module 3 comprises washing means 33 such as a washer of the centrifuge type and/or homogenisation means such as a high-pressure pump crushing the fractions 9, 10, 11. This washing or homogenisation is intended to clean from the fractions undesired particles remaining in the egg, and to burst the fractions 9, 10, 11 in order to obtain, for each fraction, a very liquid state for the remainder of the process.

In this embodiment, a single washer or a single high-pressure pump is necessary by virtue of the buffer tanks 25, 26, 27: the fractions 9, 10, 11 are pumped in alternation by controlling the actuation of the valves 29, 30, 31.

The washer or high pressure pump can be cleaned between the washing or homogenisation of each fraction.

According to a variant embodiment, one washer or one high pressure pump is used per fraction.

The fractions 9, 10, 11 are routed to the fourth heating module 4 after washing or homogenisation.

The following step is a step of heating the fractions 9, 10, 11 to their maintenance temperature. This step involves the fourth module 4 and the fifth module 5.

According to a variant embodiment, the step of cooling to 4° C. before heating can be eliminated: the fractions 9 , 10, 11 are directly routed after filtration by the filters 15, 16, 17 to the third and fourth module 4 for the temperature rise.

The fourth module 4 comprises heating means 34 intended for heating to a temperature of around the maintenance temperature defined for each of the fractions 9, 10, 11.

The heating period and the heating means used are defined so as to expose the fractions as little as possible to temperatures of between 20 and 40° C., this region causing instability of the fractions 9, 10, 11 related to variations in pH. The pH of the whole egg, whites and yolk fractions is typically respectively 7.5, 9 to 9.2 and 6.5. The rapid passage through the region between 20° and 40° makes it possible to keep these pH values substantially constant. The products degrade with variations in pH of around 0.3. The same will apply during the cooling step described below.

Preferably this heating is thus rapid, almost immediate or around a few minutes, and uses a plate exchanger 35 as the heating means.

A plate exchanger at 10,000 litres/hour is for example used for processing a volume of 10,000 litres.

Other heating means such as an electric exchanger or a tubular exchanger, for example, can be used if the volumes of the fractions 9, 10, 11 processed are sufficiently small in order to rapidly obtain the maintenance temperature of each fraction 9, 10, 11.

The fractions 9, 10, 11 are then conducted into the fifth module 5.

In the module 5, the temperature is controlled and the fractions 9, 10, 11 are stored hot at a maintenance temperature. This hot storage enables the following mechanisms to take place:

the removal of pathogenic germs from the fractions the separation of the gases from the liquid fractions 9, 10, 11 the activation of defence mechanisms for each fraction 9, 10, 11 of the egg.

The activation would be associated with the activation of the lisozymes in the egg.

The fifth module comprises process tanks 36, 37, 38 respectively for the fractions 9, 10, 11, where these mechanisms occur, facilitated by:

the very liquid state and the bursting of the fractions obtained by washing;

the slow stirring in the process tanks 36, 37, 38 by slow stirring means 39.

The temperature of the fractions 9, 10, 11 in the process tanks 36, 37, 38 is controlled using monitoring and regulation means (not shown), independently for each tank.

The process tanks 36, 37, 38 have a hot double jacket. The capacity of the storage tanks 36, 37, 38 is for example 5000 litres or more.

The liquid fractions 9, 10, 11 are conveyed from the heating means 34 by pipes 40 situated as far as the process tanks 36, 37, 38.

For the tank 36 containing the egg white fraction 9, the temperature is maintained between approximately 40 and 50° C., preferably around 45° C. This temperature is appreciably lower than the coagulation temperature of around 57° C. The method thus prevents the risks of denaturation related to pasteurisation above 55° C.

More precisely, the egg whites 9 being a fraction sensitive to variations in heat, the temperature of the fraction 9 in the process tank 36 is initially substantially 43° C., and is then increased slowly up to the maintenance temperature of 45° C. The water used in the double jacket of the process tank is at a temperature of around 46 or 47° C. The duration of heating is increased accordingly so that the liquid egg whites reach the temperature of approximately 45° C.

For the egg yolk fraction 10, the temperature is maintained at between approximately 50 and 70° C., and preferably 55° C.

For the whole egg fraction 11, the temperature is also maintained between 50 and 70° C., and preferably 55° C.

The duration of the phase of maintaining at temperature in the process tank 36, 37, 38 is between substantially 30 minutes and three to four days, and typically approximately one hour.

This duration is a function notably of the volume processed and the required speed of obtaining the final products.

The method according to the invention makes it possible to achieve rapid heating of the fractions 9, 10, 11 to more than 40° C., and then their storage in the process tanks 36, 37, 38.

After the step of maintaining at the maintenance temperature of the fractions 9, 10, 11 in the process tanks 36, 37, 38, the fractions 9, 10, 11 are cooled to a temperature below 20° C., and preferably around 4° C. The cooling involves the fifth module 5 and the sixth module 6.

The cooling is preferably effected by recycling in closed loop in order to prevent the incorporation of air. The liquid fractions 9, 10, 11 are recycled by means of extraction pipes 41, using pumping means 42, passing through cooling means 43 such as a plate exchanger 44 which allow the rapid cooling of the fractions 9, 10, 11 and maintenance at a chosen cold storage temperature, the fractions being reinjected at the output of the exchanger 44 through pipes 45 to the process tanks 36, 37, 38. The throughput in the pumping means 42 is for example 5000 litres per hour or more.

The cooling in a closed loop takes place more slowly than if in-line cooling were used, but the risk of spoiling of the fractions during the temperature drop, notably from 40 to 20° C., is reduced compared with the heating step: the fractions at this stage have better stability, related to the great reduction in the microbial flora during the heating and the quantity of oxygen after degassing in the process tanks 36, 37, 38.

The throughput in the plate exchanger 44 is for example from 5000 to 10,000 litres per hour.

After the cooling step, the fractions 9, 10, 11 arrive, through pipes 46, at the seventh packaging module 7. This module 7 comprises packaging means 47 such as packaging machines, one per fraction. Each fraction is distributed in air-tight packages of variable capacity.

The duration of storage in these packages is between three and six months according to the type of packages used, aseptic packages allowing greater storage time.

The fractions are generally packaged cold at a temperature of below 18° C.

For viscous ▓processed▓ egg yolks, the packaging can be carried out hot without passing through the cooling step. Once packaged in packages, the fractions 9, 10, 11 obtained are ready to be stored. The whites fraction 9 can be stored at room temperature, the yolk 10 and whole egg 11 fractions are preferably stored at approximately 4° C.

The egg white can be stored for approximately six months. Egg yolks can be stored for approximately six months, or even one year with 50% sugared egg yolk and 11% salted yolk in aseptic packages.

The pumps used for the different steps of the method are for example volumetric pumps of the Mouvex type.

The Theological qualities (suitability for coagulation and swelling in particular) and the bacteriological qualities of the fractions obtained, measured between the start and end of storage, give very good results.

Bacteriological analysis (total aerobic germs, salmonella, staphylococci etc) thus reveals:

total flora per gram appreciably less than 10,000, which is the current standard, and generally below 1000 permanent absence of staphylococci and salmonelli.

The cleaning means 48 used are for example a CIP system comprising a zone 48 for sending to the different modules, and a return zone 49 from the different modules.

In the first embodiment described, the three fractions, egg white 9, egg yolk 10 and whole egg 11, are processed on distinct production lines.

According to a first variant of the first embodiment, the fractions 9, 10, 11 are processed substantially simultaneously, except, for the steps for which a common apparatus is used, as is the casing with the washing or homogenisation step and the cooling step after maintenance of temperature.

According to a second variant of the first embodiment, the processing is slightly offset, for example in order to produce one fraction in a greater quantity than the other two. The offset is however regulated by means of the buffer tanks in order to prevent spoiling of the waiting fractions.

It is also possible to increase the number of appliances used.

According to one embodiment, for the egg whites 9, two buffer tanks and two process tanks are used.

According to another embodiment, one washer or one high-pressure pump is used per fraction 9, 10, 11.

According to a second embodiment, the three fractions 9, 10, 11 are processed in one and the same production line, in alternation, the device comprising only one process tank 36.

The three fractions 9, 10, 11 are processed one after the other in the process tank 36. Regulation of the opening of the valve and of the pumping system allows storage in the buffer tanks 36, 37, 38, and then alternating heating for each fraction 9, 10, 11 in the single process tank 36, with a step of cleaning the tank 36 between the fractions 9, 10, 11.

According to a third embodiment, the method is used solely for one or two fractions chosen from amongst egg white, yolk and whole egg. As in the first embodiment, the number of elements can vary according to requirements.

The choice of the embodiment and its variant is a function notably of the number of fractions required at the end of the process, the volume of each fraction to be processed, and the cost of the installation.

It will thus be understood that very many embodiments are possible by acting on the duration and temperature at each step, and the number of elements used.

According to a fourth embodiment, an ultrafiltration step is carried out after heating to the maintenance temperature and before conveying into process tanks. The ultrafiltration makes it possible to obtain a dry extract with a controlled water content. The ultrafiltration uses ultrafiltration means 50 operating in closed circuit until the required dry extract is obtained with the process tanks 36, 37, 38. Methods other than ultrafiltration, intended for concentration, can be used.

The dry extract is next maintained in the process tanks 36, 37, 38, for example at room temperature below 30° C., and then cooled with closed recycling by the cooling means 43 to a storage temperature preferably around 4° C.

Additives such as sugar or salt or flavourings can also be added to the fractions in these process tanks.

According to a fifth embodiment, the maintenance temperature in the process tank is regulated with precision in order to obtain specific products.

The egg white fraction 9 is brought into the process tank 36 at a maintenance temperature of 40° C. The temperature is then lowered to 38° C. in 24 hours, ferments being added to the tank 36 during this period. The pH of the tank 36 is decreased following the fermentation caused, resulting in egg whites having specific organoleptic properties. The liquid whites are then cooled as described previously in a closed loop and then converted into a powder in a spray tower, for example before being packaged.

The method according to the invention results in products suited to very varied demands by modulating the processing temperatures and periods, which confers great flexibility of use on it.

For example, for industrial use with high processed volumes, such as 10,000 litres of products, it is possible to program a gentle heating in process tanks and a long storage period. For traditional standard uses, it is on the other hand possible to program high heating and a shorter storage period.

What is claimed is:

1. A method of obtaining liquid egg products with an extended shelf life comprising the steps of:

selecting at least one of the following liquid fractions obtained after breaking the eggs at a temperature of between 0 and 25° C., namely: egg whites, egg yolks, and whole egg;

storing the selected liquid fractions at a temperature at least below 20° C., for a period of less than three days;

centrifugally washing to eliminate residual impurities, and to burst the selected fraction into small particles, at a temperature of less than 20° C., rapidly heating the selected fraction within a few minutes, up to a maintenance temperature of between 40 and 55° C. for the whites fraction, and between 50 and 66° C. for the yolk fraction and the whole egg fraction;

maintaining the selected fraction at the maintenance temperature, and degassing the selected faction by slow stirring for a period of between 30 minutes and 4 days; and cooling the selected fraction to a storage temperature of below 25° C.

2. A method according to claim 1 further comprising the step of packaging the selected fraction in airtight packages after cooling.

3. A method according to claim 1, characterised in that the selected fraction is filtered immediately after breaking the eggs.

4. A method of obtaining liquid egg products with an extended shelf life comprising the steps of:

selecting at least one of the following liquid fractions obtained after breaking the eggs at a temperature of between 0 and 25° C., namely: egg whites, egg yolks, and whole egg;

storing the selected liquid fractions at a temperature at least below 20° C., for a period of less than three days;

centrifugally washing to eliminate residual impurities, and to burst the selected fraction into small particles, at a temperature of less than 20° C., rapidly heating the selected fraction within a few minutes, up to a maintenance temperature of between 40 and 55° C. for the whites fraction, and between 50 and 66° C. for the yolk fraction and the whole egg fraction;

maintaining the selected fraction at the maintenance temperature, and degassing the selected faction by slow stirring for a period of between 30 minutes and 4 days;

cooling the selected fraction to a storage temperature of below 25° C. in a closed loop.

5. A method of obtaining liquid egg products with an extended shelf life comprising the steps of:

selecting at least one of the following liquid fractions obtained after breaking the eggs at a temperature of between 0 and 25° C., namely: egg whites, egg yolks, and whole egg;

storing the selected liquid fractions at a temperature at least below 20° C., for a period of less than three days;

centrifugally washing to eliminate residual impurities, and to burst the selected fraction into small particles, at a temperature of less than 20° C., simultaneously rapidly heating all of the fractions within a few minutes, up to a maintenance temperature of between 40 and 55° C. for the whites fraction, and between 50 and 66° C. for the yolk fraction and the whole egg fraction;

maintaining the selected fraction at the maintenance temperature, and degassing the selected faction by slow stirring for a period of between 30 minutes and 4 days;

simultaneously cooling the fractions to a storage temperature of below 25° C.

6. A method of obtaining liquid egg products with an extended shelf life comprising the steps of:
   alternatively selecting all of the following liquid fractions obtained after breaking the eggs at a temperature of between 0 and 25° C., namely: egg whites, egg yolks, and whole egg;
   alternatively storing the selected liquid fractions at a temperature at least below 20° C., for a period of less than three days;
   centrifugally washing to eliminate residual impurities, and to burst the selected fraction into small particles, at a temperature of less than 20° C.,
   alternatively rapidly heating the selected fraction within a few minutes, up to a maintenance temperature of between 40 and 55° C. for the whites fraction, and between 50 and 66° C. for the yolk fraction and the whole egg fraction;
   alternatively maintaining the selected fraction at the maintenance temperature, and degassing the selected faction by slow stirring for a period of between 30 minutes and 4 days;
   alternatively cooling the selected fraction to a storage temperature of below 25° C.

7. A method of obtaining liquid egg products with an extended shelf life comprising the steps of:
   selecting at least one of the following liquid fractions obtained after breaking the eggs at a temperature of between 0 and 25° C., namely: egg whites, egg yolks, and whole egg;
   storing the selected liquid fractions at a temperature at least below 20° C., for a period of less than three days;
   centrifugally washing to eliminate residual impurities, and to burst the selected fraction into small particles, at a temperature of less than 20° C.,
   rapidly heating the selected fraction within a few minutes, up to a maintenance temperature of between 40 and 55° C. for the whites fraction, and between 50 and 66° C. for the yolk fraction and the whole egg fraction;
   ultrafiltering the selected faction such as to obtain an increase in the dry extract;
   maintaining the selected fraction at the maintenance temperature, and degassing the selected faction by slow stirring for a period of between 30 minutes and 4 days;
   cooling the selected fraction to a storage temperature of below 25°.

8. A method of obtaining liquid egg products with an extended shelf life comprising the steps of:
   selecting at least one of the following liquid fractions obtained after breaking the eggs at a temperature of between 0 and 25° C., namely: egg whites, egg yolks, and whole egg;
   storing the selected liquid fractions at a temperature at least below 20° C., for a period of less than three days;
   centrifugally washing to eliminate residual impurities, and to burst the selected fraction into small particles, at a temperature of less than 20° C.,
   rapidly heating the selected fraction within a few minutes, up to a maintenance temperature of between 40 and 55° C. for the whites fraction, and between 50 and 66° C. for the yolk fraction and the whole egg fraction;
   maintaining the selected fraction at the maintenance temperature, and degassing the selected faction by slow stirring for a period of between 30 minutes and 4 days; and
   introducing additives such as sugar or salt, then cooling the selected fraction to a storage temperature of below 25° C.

* * * * *